US012743047B2

(12) United States Patent
Kaneko et al.

(10) Patent No.: US 12,743,047 B2
(45) Date of Patent: Sep. 22, 2026

(54) FIXING MEMBER

(71) Applicant: FUJIFILM Business Innovation Corp., Tokyo (JP)

(72) Inventors: Michiaki Kaneko, Kanagawa (JP); Shigeru Tsukada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/161,077

(22) Filed: Jan. 29, 2023

(65) Prior Publication Data

US 2024/0103412 A1 Mar. 28, 2024

(30) Foreign Application Priority Data

Sep. 28, 2022 (JP) ................................ 2022-155236

(51) Int. Cl.

*G03G 21/16* (2006.01)
*B65D 19/44* (2006.01)
*G03G 15/01* (2006.01)

(52) U.S. Cl.

CPC ......... *G03G 21/1604* (2013.01); *B65D 19/44* (2013.01); *G03G 15/0142* (2013.01); (Continued)

(58) Field of Classification Search

CPC ..... G03G 15/0142; G03G 2215/00004; G03G 2215/00008; B65D 19/44
See application file for complete search history.

(56) References Cited

U.S. PATENT DOCUMENTS 8,425,165 B2 4/2013 Harada et al.
2005/0150194 A1* 7/2005 Okamuro .............. B65D 19/44 53/494

(Continued)

FOREIGN PATENT DOCUMENTS

CN 201506517 6/2010
JP H04112463 9/1992

(Continued)

OTHER PUBLICATIONS

"Notice of Reasons for Refusal of Japan Counterpart Application", issued on Jun. 9, 2026, with English translation thereof, p. 1-p. 6.

*Primary Examiner* — Erika J. Villaluna
(74) *Attorney, Agent, or Firm* — JCIPRNET

(57) ABSTRACT

A fixing member that fixes a lower surface of an apparatus having a caster to an upper surface of a base includes: an engagement part that is inserted through a through hole provided in the lower surface of the apparatus, extends along an upper side of the lower surface of the apparatus, and is engaged with the lower surface of the apparatus; an attachment part that extends along an upper side of the upper surface of the base so as to face the engagement part and is attached to the upper surface of the base; a connection part that has a bent part bent away from the engagement part, is attached to the engagement part at one end thereof and is attached to the attachment part at the other end thereof, and connects the engagement part and the attachment part by passing through the through hole; and a load receiving part that receives a load by making contact with a lower side of the lower surface of the apparatus. The one end of the connection part is located on a rear side relative to the other end of the connection part in a direction in which the engagement part extends.

7 Claims, 5 Drawing Sheets

(52) U.S. Cl.
CPC .................. *G03G 21/1647* (2013.01); *G03G 2215/00008* (2013.01)

(56) References Cited

U.S. PATENT DOCUMENTS

| | | | | |
|---|---|---|---|---|
| 2017/0320651 A1 | | 11/2017 | Chen et al. | |
| 2022/0396395 A1* | | 12/2022 | Kono | B65D 19/44 |
| 2023/0023277 A1* | | 1/2023 | Tsukada | B65D 19/44 |
| 2024/0101310 A1 | | 3/2024 | Kaneko et al. | |

FOREIGN PATENT DOCUMENTS

| | | |
|---|---|---|
| JP | H1095429 | 4/1998 |
| JP | H10209657 | 8/1998 |
| JP | 2005186939 | 7/2005 |
| JP | 2012062112 | 3/2012 |
| JP | 2024048791 | 4/2024 |

* cited by examiner

FIXING MEMBER

CROSS-REFERENCE TO RELATED APPLICATIONS

This application is based on and claims priority under 35 USC 119 from Japanese Patent Application No. 2022-155236 filed Sep. 28, 2022.

BACKGROUND

(i) Technical Field

The present disclosure relates to a fixing member.

(ii) Related Art

Japanese Unexamined Patent Application Publication No. 10-095429 describes a support structure for a pallet for mounting of an apparatus. This support structure is a support structure for a pallet for elastically supporting and fixing an apparatus having a caster and includes an elastic member that is detachably housed in a groove part of a deck board provided on an upper surface of the pallet and supports the caster, and a fixing member that is detachably inserted between a lower surface of the apparatus and the deck board and is fixed to the lower surface of the apparatus and the deck board only by bolt fastening or nut fastening, and an upper surface of the elastic member is almost flush with the upper surface of the deck board.

Japanese Unexamined Patent Application Publication No. 2012-062112 describes a fixing member in a pallet apparatus. This fixing member is fixed to a pallet base with the use of a screw member, has a U-shaped cross section, and has plural slits through which the screw member can pass. A position of a bottom surface of a product is changed by using the slits and the screw member, and thereby the fixing member can be easily put into a position below the product and taken out from the position below the product.

SUMMARY

For example, in a case where an apparatus having a caster on a bottom surface thereof such as an image forming apparatus is transported while being placed on a base such as a pallet, the apparatus is transported in a state where a lower surface of the apparatus and an upper surface of the base are fixed by using a fixing member.

Some fixing members can be attached to an apparatus by engagement (sometimes called "engagement type") of an engagement part inserted through a through hole provided in a lower surface of the apparatus. Use of the engagement type makes it easier to attach a fixing member to an apparatus than a fixing member attached by using a screw member such as a bolt or a nut (sometimes called "screw type"). In a case where the engagement type is employed, a height dimension of the fixing member is larger than a distance between a lower surface of an apparatus and an upper surface of a base. Accordingly, the fixing member is inclined when the fixing member is attached or detached.

When external force such as a strong shake or shock is given in a state where the fixing member is attached to an apparatus and a base, the fixing member may be plastically deformed. The plastic deformation changes a dimension of the fixing member, thereby leading to a risk of a decrease in operability related to detachment.

Aspects of non-limiting embodiments of the present disclosure relate to a fixing member that keeps a decrease in operability related to detachment small even in a case where plastic deformation occurs.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a fixing member that fixes a lower surface of an apparatus having a caster to an upper surface of a base, the fixing member including: an engagement part that is inserted through a through hole provided in the lower surface of the apparatus, extends along an upper side of the lower surface of the apparatus, and is engaged with the lower surface of the apparatus; an attachment part that extends along an upper side of the upper surface of the base so as to face the engagement part and is attached to the upper surface of the base; a connection part that has a bent part bent away from the engagement part, is attached to the engagement part at one end thereof and is attached to the attachment part at the other end thereof, and connects the engagement part and the attachment part by passing through the through hole; and a load receiving part that receives a load by making contact with a lower side of the lower surface of the apparatus, wherein the one end of the connection part is located on a rear side relative to the other end of the connection part in a direction in which the engagement part extends.

BRIEF DESCRIPTION OF THE DRAWINGS

An exemplary embodiment of the present disclosure will be described in detail based on the following figures, wherein:

FIG. 2A is a perspective view of the fixing member, and FIG. 2B is a cross-sectional view taken along line IIB-IIB in FIG. 2A;

FIG. 3A illustrates how the fixing member is inserted between a lower surface of the image forming apparatus and an upper surface of the pallet, FIG. 3B illustrates how the engagement part is inserted through a through hole, and FIG. 3C illustrates how the engagement part is engaged;

FIG. 5A illustrates a fixing member according to the first comparative example, and FIG. 5B illustrates a fixing member according to a second comparative example.

DETAILED DESCRIPTION

Fixing of Apparatus by Fixing Member

An exemplary embodiment of the present disclosure (hereinafter sometimes referred to as a "present exemplary embodiment") is described below with reference to the attached drawings.

First, fixing of an apparatus by a fixing member is described. In the following description, a case where an image forming apparatus, which is an example of an apparatus having a caster, is fixed to a pallet, which is an example of a base, is taken as an example.

Figure 1:
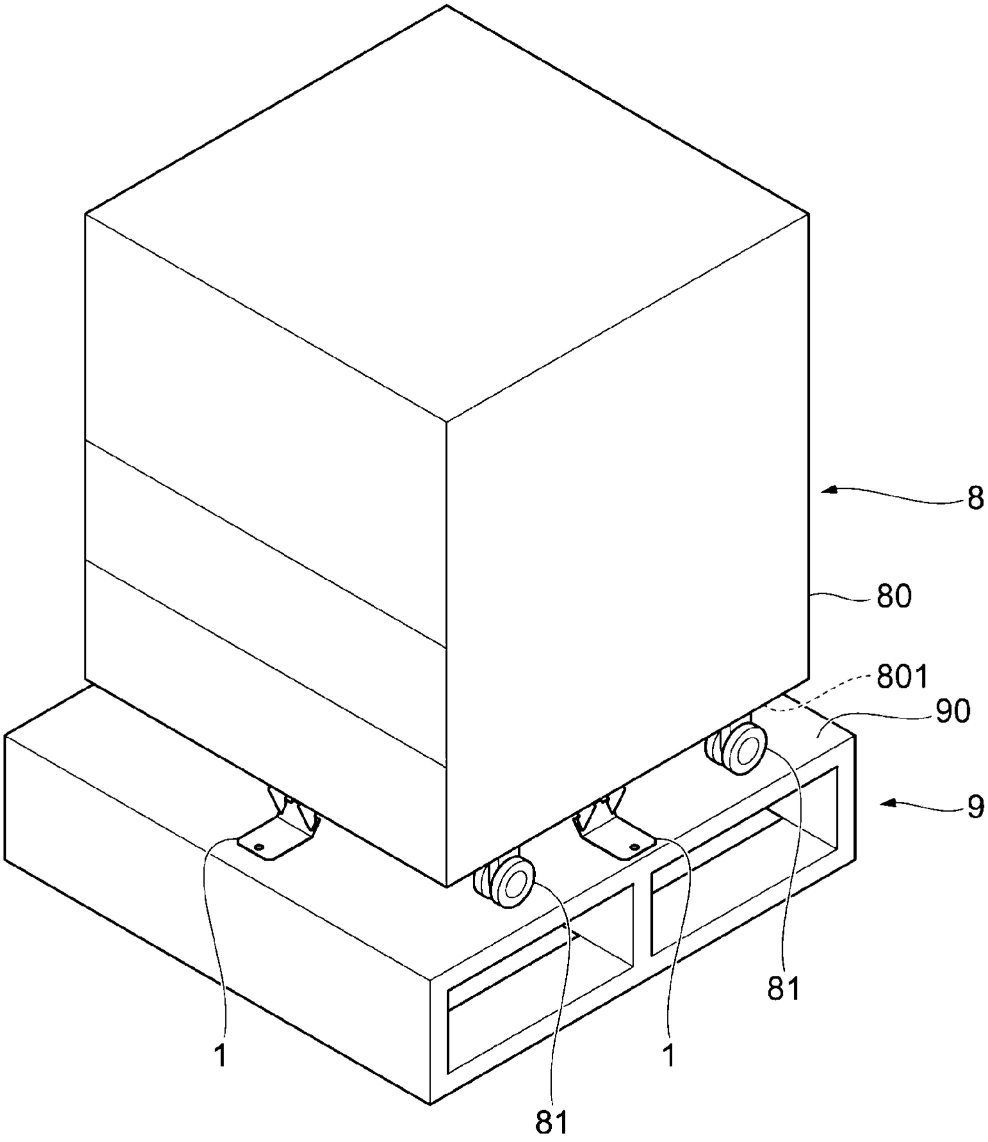
FIG. 1 illustrates a state where an image forming apparatus is fixed to a pallet by a fixing member.

FIG. 1 illustrates a state where an image forming apparatus 8 is fixed to a pallet 9 by a fixing member 1. In the following description, it is assumed that a side where the pallet 9 is located relative to the image forming apparatus 8 is a lower side and a side where the image forming apparatus 8 is located relative to the pallet 9 is an upper side.

The image forming apparatus 8 includes a body 80 including various functional parts such an image forming part and a caster 81 that supports the body 80 so that the body 80 is movable.

The caster 81 is attached to a lower surface 801 of the body 80 and allows the body 80 to move in a front-rear direction, a left-right direction, and oblique directions by a wheel.

The lower surface 801 is a housing of the body 80 and is a lower end in external appearance of the body 80. The lower surface 801 is, for example, made of an elastic material such as plastic.

The pallet 9 is a block on which the image forming apparatus 8 is placed, for example, when the image forming apparatus 8 is transported, and is, for example, made of an elastic material such as wood or plastic.

The pallet 9 has, in a side surface (given no reference sign) thereof, a groove (a fork pocket) into which a claw of a forklift is to be inserted so that the pallet 9 and the image forming apparatus 8 can be lifted up and transported by the forklift.

Although the lower surface 801 of the image forming apparatus 8 and an upper surface 90 of the pallet 9 are described as flat surfaces that face each other, the lower surface 801 and the upper surface 90 may be curved surfaces or may have an irregular shape provided with a groove, a protrusion, a hole, or the like.

Since the image forming apparatus 8 has the caster 81 as described above, the image forming apparatus 8 needs to be fixed on the pallet 9 so as not to move at least when the image forming apparatus 8 is transported.

As illustrated in FIG. 1, the fixing member 1 ties and fastens the lower surface 801 of the image forming apparatus 8 and the upper surface 90 of the pallet 9 to each other and thereby fixes the image forming apparatus 8 so that the image forming apparatus 8 does not move on the pallet 9.

In the example of FIG. 1, the image forming apparatus 8 is fixed by four fixing members 1 attached on front and rear sides and left and right sides. Among the four fixing members 1, two fixing members 1 are hidden by the image forming apparatus 8 and therefore are not illustrated.

Fixing Member 1

Next, the fixing member 1 to which the present exemplary embodiment is applied is described in detail.

Figure 2A:
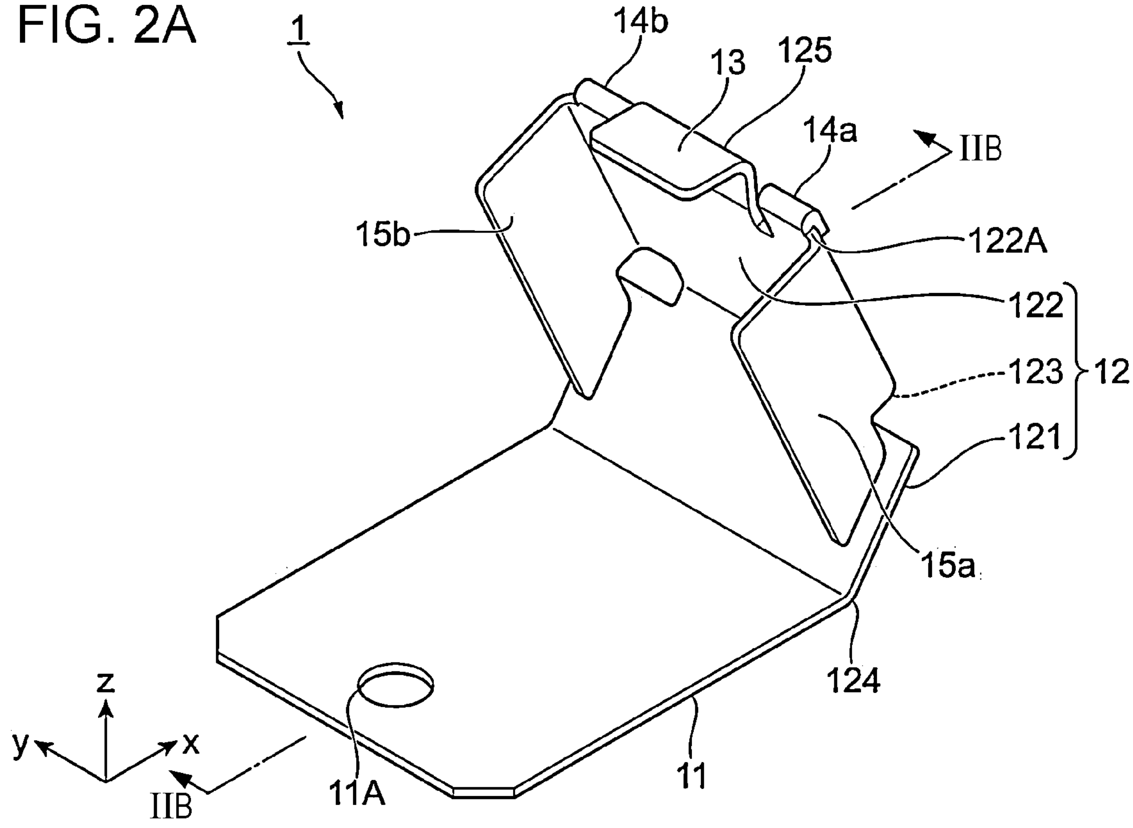
FIGS. 2A and 2B are views for explaining a fixing member to which an exemplary embodiment of the present disclosure is applied.
Figure 2B:
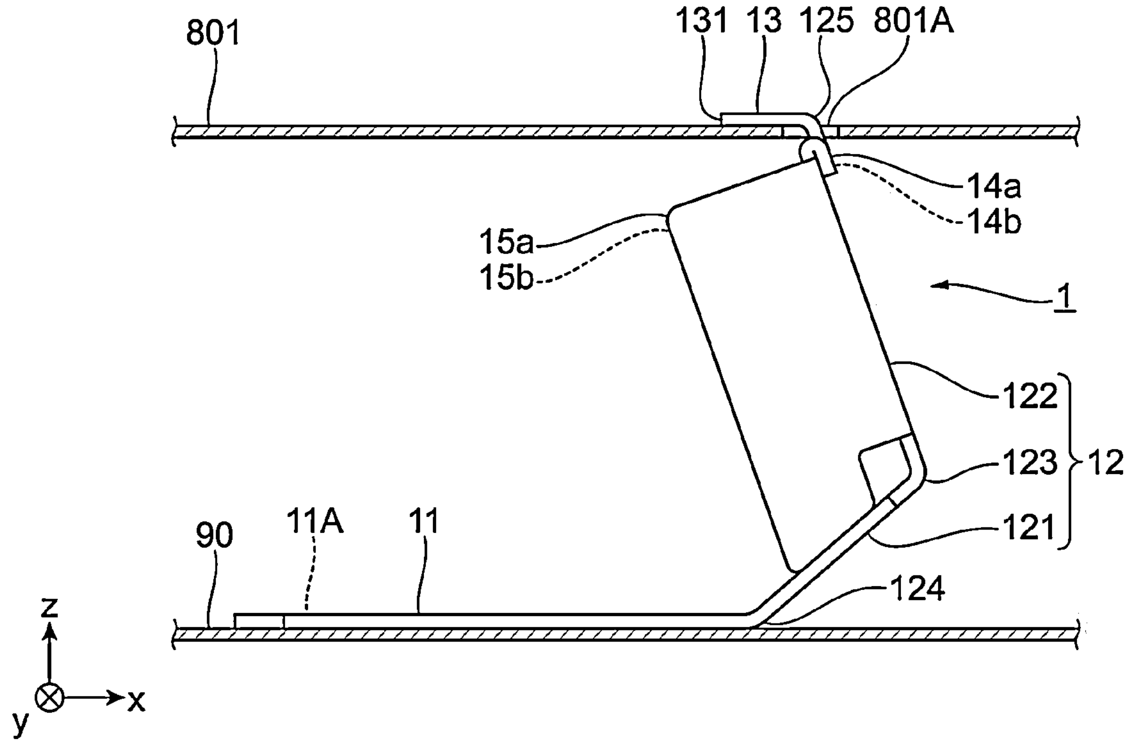

FIGS. 2A and 2B are views for explaining the fixing member 1 to which the exemplary embodiment of the present disclosure is applied. FIG. 2A is a perspective view of the fixing member 1, and FIG. 2B is a cross-sectional view taken along line IIB-IIB in FIG. 2A. Note that a state (hereinafter sometimes referred to as an "attachment state") where the fixing member 1 is attached to the lower surface 801 of the image forming apparatus 8 and the upper surface 90 of the pallet 9 is illustrated for explanation in FIG. 2B.

A direction toward an upper right side, a direction toward an upper left side, and a direction toward an upper side in FIG. 2A are a +x direction, a +y direction, and a +z direction, respectively, and a direction toward a right side, a direction toward a rear face of the paper on which FIG. 2B is drawn (a direction toward a depth side), and an upper side in FIG. 2B are the +x direction, the +y direction, and the +z direction, respectively.

As illustrated in FIGS. 2A and 2B, the fixing member 1 to which the present exemplary embodiment is applied includes an attachment part 11, a connection part 12, an engagement part 13, a load receiving part 14 (load receiving parts **14*a* and 14*b*), and a lateral supporting part 15 (lateral supporting parts 15*a* and 15*b***).

The fixing member 1 to which the present exemplary embodiment is applied is configured such that adjacent parts are formed from a continuous plate material.

The plate material that forms the fixing member 1 may be, for example, a metal plate.

The attachment part 11 is a part for attaching the fixing member 1 to the pallet 9, and extends along an upper side of the upper surface 90 of the pallet 9 in the attachment state, as illustrated in FIG. 2B.

As illustrated in FIG. 2A, the attachment part 11 according to the present exemplary embodiment has a plate shape and has a screw hole 11A. The attachment part 11 is attached to the upper surface 90 by a screw member (not illustrated) passing through the screw hole 11A.

Although an example in which the attachment part 11 has a hexagonal shape is illustrated in FIG. 2A, the shape of the attachment part 11 is not limited.

The connection part 12 is a part that connects the attachment part 11 and the engagement part 13. More specifically, in the attachment state, the connection part 12 connects the attachment part 11 and the engagement part 13 by passing through a through hole 801A provided in the lower surface 801 of the image forming apparatus 8, as illustrated in FIG. 2B.

In other words, one end (an end in the +z direction in FIGS. 2A and 2B) of the connection part 12 is continuous with the engagement part 13, and the other end (an end in the −z direction in FIGS. 2A and 2B) of the connection part 12 is continuous with the attachment part 11. The one end of the connection part 12, which is an end part continuous with the engagement part 13, is an end part 125. The other end of the connection part 12, which is an end part continuous with the attachment part 11, is an end part 124.

The connection part 12 according to the present exemplary embodiment is a plate member that is bent in a direction away from the engagement part 13 (the +x direction in FIG. 2B) at a bent part 123, and has a lower part 121 on a lower side (i.e., a side close to the attachment part 11) relative to the bent part 123 and an upper part 122 on an upper side (i.e., a side close to the engagement part 13) relative to the bent part 123.

The lower part 121 extends from the bent part 123 toward an oblique direction that is the −x direction and the −z direction.

The upper part 122 extends from the bent part 123 toward an oblique direction that is the −x direction and the +z direction.

In the present exemplary embodiment, the bent part 123 is provided closer to the attachment part 11 than to the engagement part 13. That is, the bent part 123 is provided on a lower side (−z direction side) relative to a midpoint of the connection part 12 in a direction (the z direction in FIG. 2B) in which the attachment part 11 and the engagement part 13 face each other.

The engagement part 13 is a part for engaging the fixing member 1 with the lower surface 801 of the image forming apparatus 8, and extends along an upper side of the lower surface 801 so as to face the attachment part 11 in the attachment state, as illustrated in FIG. 2B. In the example of FIG. 2B, the attachment part 11 and the engagement part 13 extend toward the −x direction so as to face each other. Note that an end part (leading end) of the engagement part 13 in the −x direction is a leading end 131. In other words, the leading end 131 is an end part of the engagement part 13 opposite to the end part 125.

The engagement part 13 according to the present exemplary embodiment has a plate shape bent from an upper end 122A of the connection part 12, as illustrated in FIG. 2A. The engagement part 13 is located on the upper side of the lower surface 801 by passing through the through hole 801A provided in the lower surface 801 and is engaged with the lower surface 801 although details will be described later with reference to FIG. 3C.

Note that a width, in the y direction, of the through hole 801A provided in the lower surface 801 of the image forming apparatus 8 is larger than widths, in they direction, of portions of the engagement part 13 and the connection part 12 that pass through the through hole 801A.

The load receiving part 14 is provided on a side (+x direction) opposite to the engagement part 13 relative to the connection part 12 and receives a load of the image forming apparatus 8. More specifically, the load receiving part 14 makes contact with the lower surface 801 and receives the load of the image forming apparatus 8 in the attachment state, as illustrated in FIG. 2B.

As illustrated in FIGS. 2A and 2B, the load receiving part 14 according to the present exemplary embodiment is a curved surface. In other words, in the attachment state, a part that makes contact with the lower surface 801 of the image forming apparatus 8 as the load receiving part 14 has curvature.

Note that the width, in the y direction, of the through hole 801A provided in the lower surface 801 of the image forming apparatus 8 is smaller than a distance between the two load receiving parts 14*a* and 14*b*. With this configuration, the load receiving parts 14*a* and 14*b* make contact with parts of the lower surface 801 where the through hole 801A is not provided and receive the load.

The load receiving part 14 is a curved surface formed by hemming-bending, toward the bent part 123, a plate member extending continuously from the upper end 122A of the connection part 12.

The lateral supporting part 15 is a part extending laterally from the connection part 12, and supports the load of the image forming apparatus 8 when an amount of deformation of the fixing member 1 caused by the load becomes large (described later with reference to FIG. 3C). In this way, an amount of deformation of the fixing member 1 may be kept from becoming larger than a predetermined amount.

The lateral supporting part 15 according to the present exemplary embodiment is a part that is formed by bending a plate member continuous from the upper part 122 of the connection part 12 and extend toward the −x direction.

As illustrated in FIG. 2B, in the fixing member 1 to which the present exemplary embodiment is applied, the end part 125 of the connection part 12 is located on a rear side relative to the end part 124 of the connection part 12 in a direction (the −x direction in FIGS. 2A and 2B) in which the engagement part 13 extends.

Furthermore, the end part 125 of the connection part 12 is located on a rear side relative to the leading end 131 of the engagement part 13 in the direction (the −x direction in FIGS. 2A and 2B) in which the engagement part 13 extends.

That is, the leading end 131, the end part 124, and the end part 125 are located in this order from the −x direction side.

Attachment of Fixing Member 1

Next, a procedure of attaching the fixing member 1 is described.

Figure 3A:
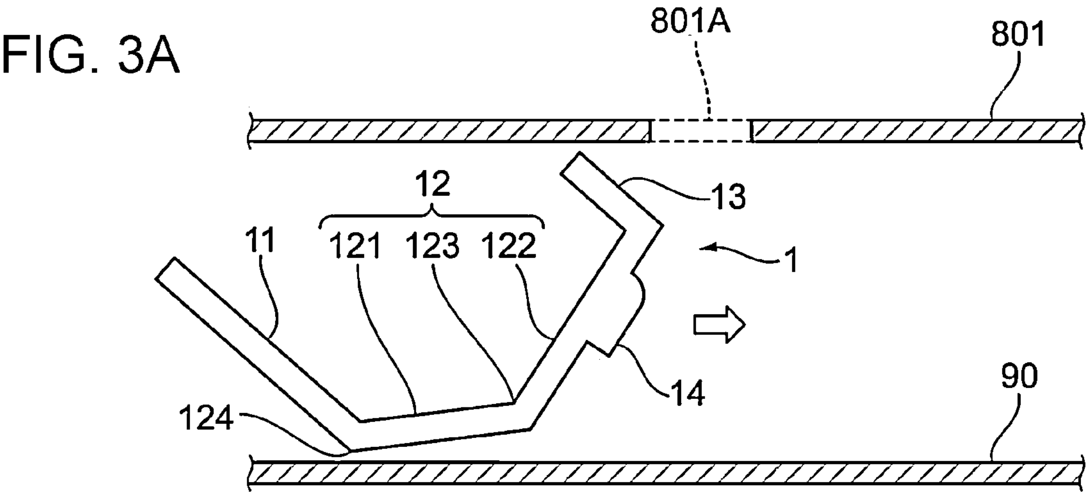
FIGS. 3A to 3C are views for explaining a procedure for attaching the fixing member.
Figure 3B:
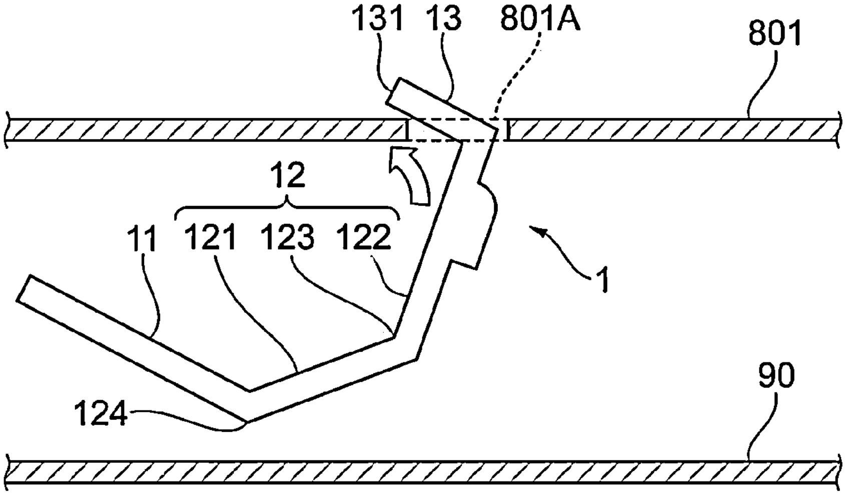
Figure 3C:
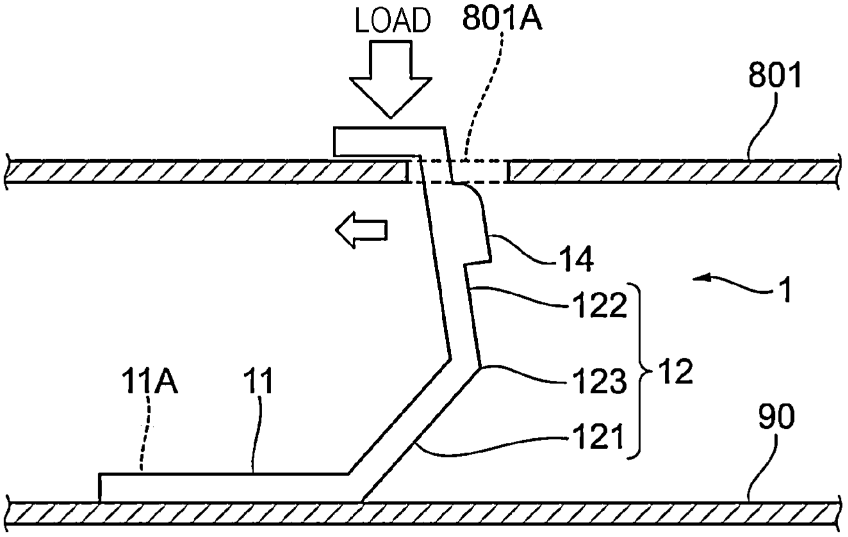

FIGS. 3A to 3C are views for explaining a procedure of attaching the fixing member 1, and FIG. 3A illustrates how the fixing member 1 is inserted between the lower surface 801 of the image forming apparatus 8 and the upper surface 90 of the pallet 9, FIG. 3B illustrates how the engagement part 13 is inserted through the through hole 801A, and FIG. 3C illustrates how the engagement part 13 is engaged. Each of FIGS. 3A to 3C is a cross-sectional view taken along line IIB-IIB, as with FIG. 2B.

First, as illustrated in FIG. 3A, the fixing member 1 is inclined about the end part 124 of the connection part 12 (in a clockwise direction in the example of FIG. 3A). Note that the fixing member 1 needs to be thus inclined since a height (a dimension in the z direction in FIGS. 2A and 2B) of the fixing member 1 is larger than the distance between the lower surface 801 and the upper surface 90.

Then, the fixing member 1 is inserted into a space between the lower surface 801 and the upper surface 90 as indicated by the white arrow.

Next, as illustrated in FIG. 3B, the leading end 131 of the engagement part 13 of the fixing member 1 is passed through the through hole 801A of the lower surface 801.

Then, as indicated by the white arrow, an angle of the fixing member 1 is adjusted by inclining the fixing member 1 in a direction (a counterclockwise direction in FIG. 3B) opposite to FIG. 3A about the end part 124.

In this way, the engagement part 13 passes through the through hole 801A. Furthermore, the upper end of the connection part 12 passes through the through hole 801A.

The adjustment of the angle of the fixing member 1 is performed until the attachment part 11 and the upper surface 90 become substantially parallel with each other, as illustrated in FIG. 3C.

Then, a position of the fixing member 1 is adjusted until the connection part 12 hits an edge (a left end in FIG. 3C) of the through hole 801A, as indicated by the white arrow. In this way, the engagement part 13 is engaged with the lower surface 801.

After the procedure illustrated in FIGS. 3A to 3C is completed, the screw member (not illustrated) is passed through the screw hole 11A and fastened, and thereby attachment of the fixing member 1 is completed, and the attachment state is achieved.

As illustrated in FIG. 3C, in the attachment state of the fixing member 1, the load receiving part 14 is in contact with a lower side of the lower surface 801. In a case where no external force is applied in a state where the image forming apparatus 8 and the pallet 9 are standing still, the load of the image forming apparatus 8 is supported by the caster 81 (see FIG. 1), and a load applied to the load receiving part 14 is smaller than the load of the image forming apparatus 8 and is, for example, substantially zero.

In the attachment state, external force such as a shake or a shock is sometimes applied to the image forming apparatus 8 and the pallet 9, for example, in a case where the image forming apparatus 8 and the pallet 9 are transported.

When the external force is applied, the lower surface 801 of the image forming apparatus 8 and the upper surface 90 of the pallet 9 are elastically deformed, and thereby force directed from the lower surface 801 toward the upper surface 90 (force that brings the lower surface 801 and the upper surface 90 closer to each other) acts. This force is supported by the load receiving part 14.

When a load supported by the load receiving part 14 becomes large upon application of the external force to the image forming apparatus 8 and the pallet 9, the fixing member 1 starts to be deformed, and in a case where the load supported by the load receiving part 14 becomes too large and exceeds a predetermined load (yield point), plastic deformation occurs in the fixing member 1.

As a result of the plastic deformation, at least a part of energy derived from the external force is consumed. That is, the fixing member 1 to which the present exemplary embodiment is applied also functions as a buffer material that lessens (buffers) force applied to the image forming apparatus 8 and the pallet 9.

Plastic Deformation of Fixing Member

Details of plastic deformation of the fixing member is described in detail below with reference to FIGS. 4 and 5A and 5B.

Figure 4:
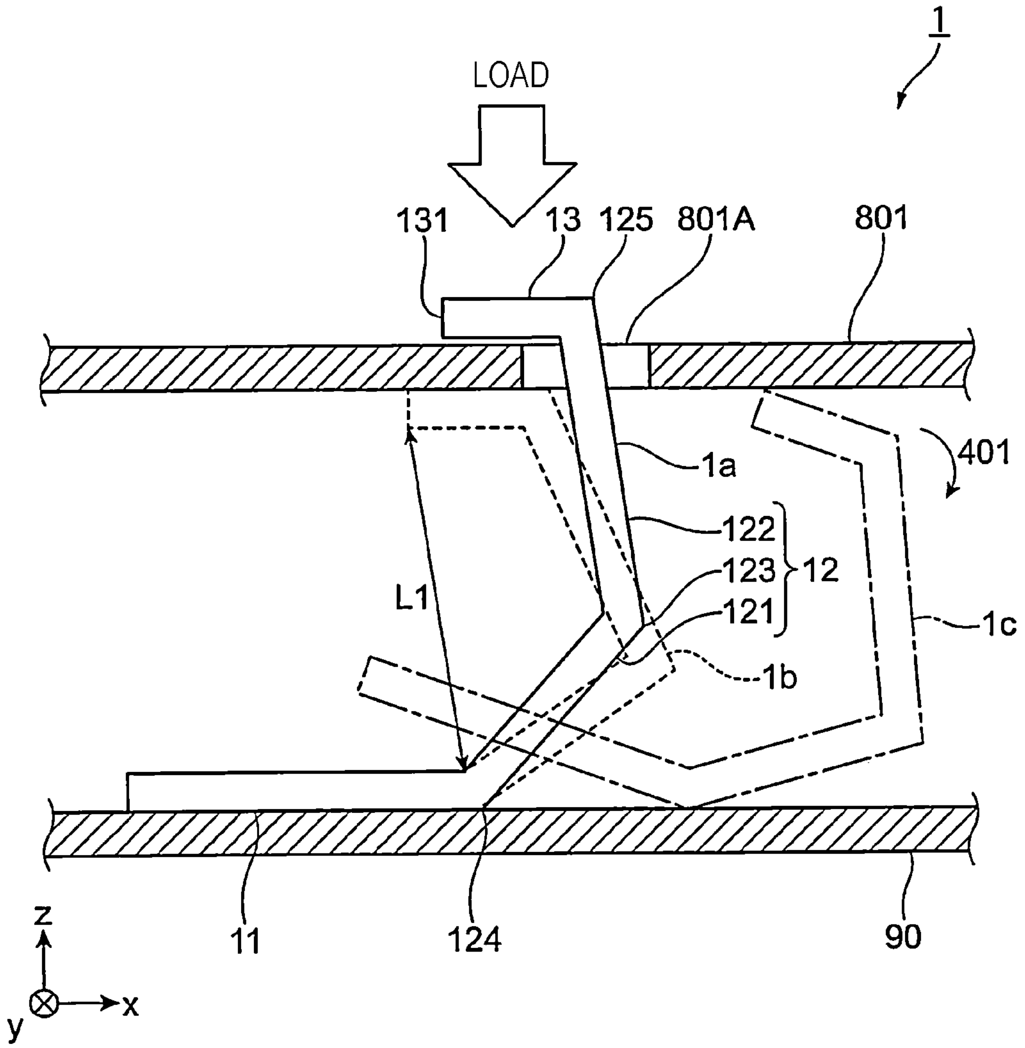
FIG. 4 is a view for explaining plastic deformation occurring in the fixing member to which the exemplary embodiment of the present disclosure is applied.

FIG. 4 is a view for explaining plastic deformation occurring in the fixing member 1 to which the exemplary embodiment of the present disclosure is applied, and is a cross-sectional view taken along line IIB-IIB as with FIG. 2B. For convenience of description, the fixing member 1 is illustrated in a simplified manner, and some constituent elements such as the load receiving part 14 (see FIG. 2) are omitted.

In FIG. 4, the reference sign 1*a* indicated by the solid line corresponds to the fixing member 1 before occurrence of plastic deformation that is in the attachment state, the reference sign 1*b* indicated by the broken line corresponds to the fixing member 1 after occurrence of plastic deformation that is in the attachment state, and the reference sign 1*c* indicated by the line with alternate long and short dashes corresponds to the fixing member 1 after occurrence of plastic deformation that is inclined for detachment.

Figure 5A:
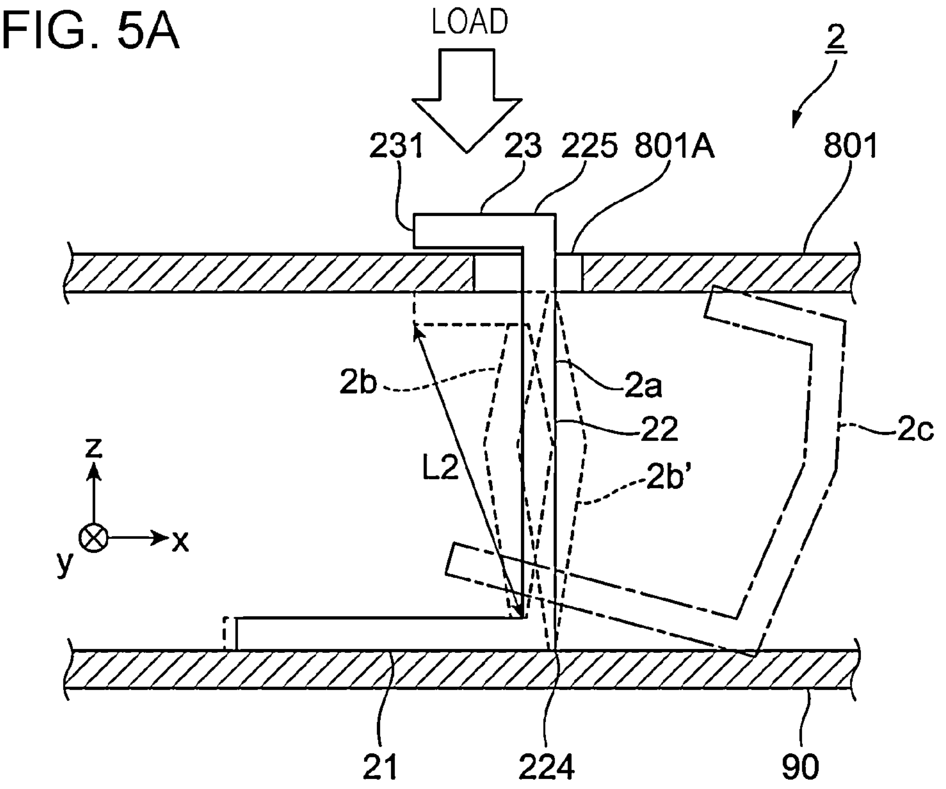
FIGS. 5A and 5B are views for explaining plastic deformation occurring in fixing members according to comparative examples to which the exemplary embodiment of the present disclosure is not applied.
Figure 5B:
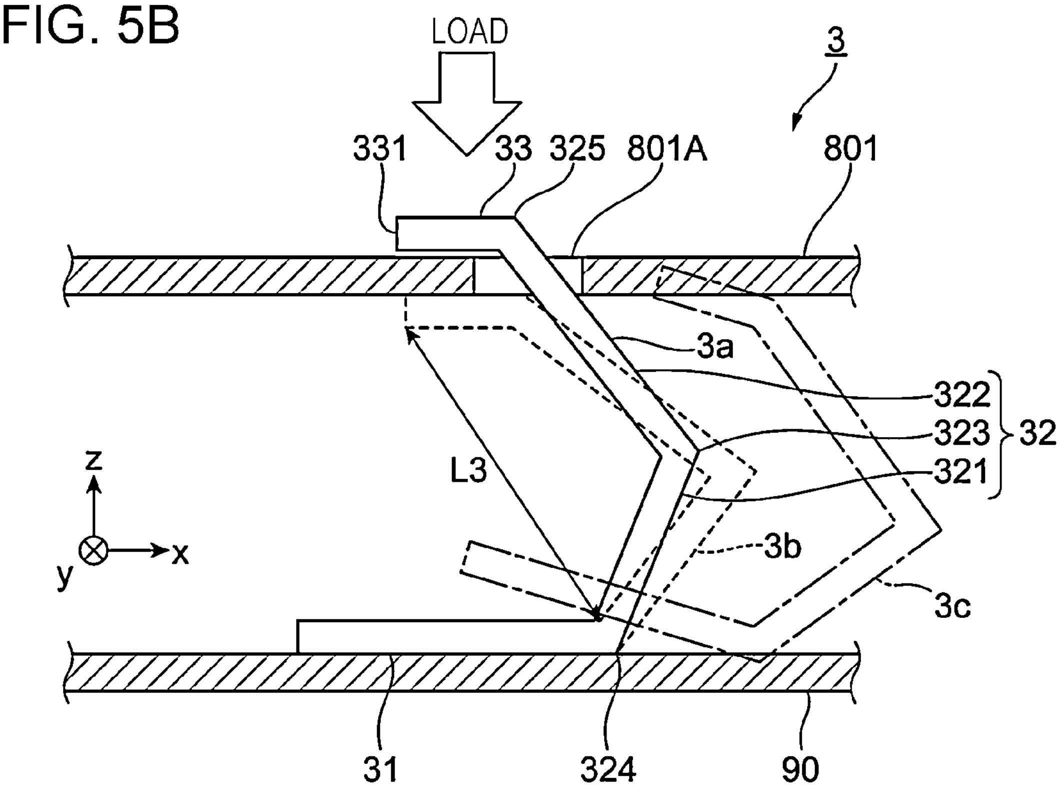

FIGS. 5A and 5B are views for explaining plastic deformation occurring in fixing members 2 and 3 according to comparative examples to which the exemplary embodiment of the present disclosure is not applied, and FIG. 5A illustrates the fixing member 2 according to a first comparative example, and FIG. 5B illustrates the fixing member 3 according to the second comparative example. Each of FIGS. 5A and 5B is a cross-sectional view similar to FIG. 4.

Hereinafter, constituent elements of the fixing member 2 according to the first comparative example that correspond to those of the fixing member 1 to which the present exemplary embodiment is applied and constituent elements of the fixing member 3 according to the second comparative example that correspond to those of the fixing member 1 are given reference signs identical to those of the fixing member 1, and detailed description thereof may be omitted.

In FIGS. 5A and 5B, the reference sign 2*a* and the reference sign 3*a* indicated by the solid line correspond to the fixing member 2 and the fixing member 3 before occurrence of plastic deformation that are in the attachment state, the reference sign 2*b*/2*b*' and the reference sign 3*b* indicated by the broken line correspond to the fixing member 2 and the fixing member 3 after occurrence of plastic deformation that are in the attachment state, and the reference sign 2*c* and the reference sign 3*c* indicated by the line with alternate long and short dashes correspond to the fixing member 2 and the fixing member 3 after occurrence of plastic deformation that are inclined for detachment.

As illustrated in FIG. 5A, the fixing member 2 according to the first comparative example includes an attachment part 21 attached to the upper surface 90 of the pallet 9, an engagement part 23 engaged with the lower surface 801 of the image forming apparatus 8, and a connection part 22 that connects the attachment part 21 and the engagement part 23. More specifically, one end part (an end part in the +z direction in FIG. 5A) 225 of the connection part 22 is continuous with the engagement part 23, and the other end part (an end part in the −z direction in FIG. 5A) 224 of the connection part 22 is continuous with the attachment part 21.

According to the fixing member 2 according to the first comparative example, the connection part 22 does not have a bent part and extends as a flat surface orthogonal to the lower surface 801 and the upper surface 90. Accordingly, the end part 225 and the end part 224 are located at an identical position in a direction (the −x direction in FIG. 5A) in which the engagement part 23 extends.

As illustrated in FIG. 5B, the fixing member 3 according to the second comparative example includes an attachment part 31 attached to the upper surface 90 of the pallet 9, an engagement part 33 engaged with the lower surface 801 of the image forming apparatus 8, and a connection part 32 that connects the attachment part 31 and the engagement part 33. More specifically, one end part (an end part in the +z direction in FIG. 5B) 325 of the connection part 32 is continuous with the engagement part 33, and the other end part (an end part in the −z direction in FIG. 5B) 324 of the connection part 32 is continuous with the attachment part 31. The connection part 32 has a bent part 323.

According to the fixing member 3 according to the second comparative example, the end part 325 is located on a front side relative to the end part 324 in the direction (the −x direction in FIG. 5B) in which the engagement part 33 extends.

As illustrated in FIG. 4, in the present exemplary embodiment, in the fixing member 1*a* before occurrence of plastic deformation that is in the attachment state, the engagement part 13 is located on the upper side of the lower surface 801 of the image forming apparatus 8, and the attachment part 11 is attached to the upper surface 90 of the pallet 9. That is, a height dimension (a dimension in the z direction in FIG. 4) of the fixing member 1 is larger than the distance between the lower surface 801 and the upper surface 90.

As illustrated in FIGS. 5A and 5B, height dimensions (dimensions in the z direction in FIGS. 5A and 5B) of the fixing members 2*a* and 3*a* according to the first comparative example and the second comparative example are also larger than the distance between the lower surface 801 and the upper surface 90.

As illustrated in FIG. 4, when external force is applied to the image forming apparatus 8 and the pallet 9, force that reduces the distance between the lower surface 801 and the upper surface 90 is applied. For example, the lower surface 801 is deformed so as to be warped downward by the external force, and thereby the distance between the lower surface 801 and the upper surface 90 is reduced. In this state, a load indicated by the white arrow is supported by the load receiving part 14 (see FIG. 3C) of the fixing member 1*a*.

When the load supported by the load receiving part 14 becomes too large (exceeds a yield point), plastic deformation occurs in the fixing member 1*a*. This plastic deformation reduces the height dimension of the fixing member 1 corresponding to the direction in which the load is applied, as indicated by the fixing member 1*b*.

Although the engagement part 13 is kept engaged with the lower surface 801 as a result of the warpage of the lower surface 801 even in the fixing member 1*b* after occurrence of plastic deformation, the warped lower surface 801 is omitted in FIG. 4.

As illustrated in FIGS. 5A and 5B, also in the fixing members 2*a* and 3*a* according to the first comparative example and the second comparative example, when the supported load becomes too large (exceeds a yield point), plastic deformation occurs, and the height dimension is reduced, as indicated by the fixing members 2*b*/2*b*' and 3*b*.

Although the engagement parts 23 and 33 are kept engaged with the lower surface 801 as a result of the warpage of the lower surface 801 also in the fixing members 2*b*/2*b*' and 3*b* after occurrence of plastic deformation, the warped lower surface 801 is omitted in FIGS. 5A and 5B.

In a case where plastic deformation occurs in the fixing member 1 to which the present exemplary embodiment is applied, deformation in the connection part 12 is guided by the bent part 123. More specifically, stress is concentrated on the bent part 123 when the load is received, and deformation at the bent part 123 is more likely to occur than other parts.

As illustrated in FIG. 5A, according to the fixing member 2 according to the first comparative example, the connection part 22 has no bent part, and therefore a way in which plastic deformation occurs is not stable. For example, plastic deformation that causes the connection part 22 to protrude in the −x direction may occur as indicated by the fixing member 2*b* or plastic deformation that causes the connection part 22 to protrude in the +x direction may occur as indicated by the fixing member 2*b*'. That is, the shape of the fixing member 2*b*/2*b*' after plastic deformation is not stable and may become an unintended shape and as a result workability related to detachment may undesirably decrease.

On the other hand, according to the fixing member 1 according to the present exemplary embodiment, plastic deformation is guided by the bent part 123, and therefore a way in which plastic deformation occurs is more stable than in a case where the bent part 123 is not provided. That is, the shape of the fixing member 1*b* after plastic deformation becomes stable, and a decrease in operability related to detachment may be kept small.

As indicated by the fixing member 1*b* in FIG. 4, the bent part 123 is bent to a larger extent so as to move away from the engagement part 13 by plastic deformation. As a result, in the fixing member 1 according to the present exemplary embodiment, an amount of deformation caused by plastic deformation becomes larger than in a case where the bent part 123 is not provided.

As illustrated in FIG. 4, according to the fixing member 1*a* before occurrence of plastic deformation, the end part 125 of the connection part 12 is located on a rear side relative to the end part 124 of the connection part 12 in the direction (−x direction in FIG. 4) in which the engagement part 13 extends. On the other hand, according to the fixing member 2*a* illustrated in FIG. 5A, the end part 225 and the end part 224 of the connection part 22 are located at the same position, and according to the fixing member 3*a* illustrated in FIG. 5B, the end part 325 of the connection part 32 is located on a front side relative to the end part 324 of the connection part 32. Accordingly, a distance between the leading end 131 of the engagement part 13 and the end part 124 in the fixing member 1*a* is smaller than a distance between the leading end 231 of the engagement part 23 and the end part 224 in the fixing member 2*a* and a distance between the leading end 331 of the engagement part 33 and the end part 324 in the fixing member 2*b*.

Assume that a distance between the leading end 131 and the end part 124 in the fixing members 1*b* and 1*c* is L1 (see FIG. 4), a distance between the leading end 231 and the end part 224 in the fixing members 2*b* and 2*c* is L2 (see FIG. 5A), and a distance between the leading end 331 and the end part 324 in the fixing members 3*b* and 3*c* is L3 (see FIG. 5B) in a case where the height dimensions of the fixing members 1, 2, and 3 after occurrence of plastic deformation in the exemplary embodiment of the present disclosure, the first comparative example, the second comparative example are equal. In this case, the distance L1 is smaller than the distances L2 and L3 (L1<L2 and L3), similarly to the relationship before occurrence of plastic deformation.

Detachment after Occurrence of Plastic Deformation

As indicated by the fixing member 1*c* in FIG. 4, to detach the fixing member 1*b* after occurrence of plastic deformation, the engagement part 13 is disengaged by inclining the fixing member 1*b* in a direction (clockwise direction) indicated by the curved arrow 401. Then, the inclined fixing member 1*c* is drawn out in the +x direction or the −x direction and is thus detached. As illustrated in FIGS. 5A and 5B, the fixing members 2*b* and 3*b* after occurrence of plastic deformation are also detached in a similar manner.

Since the distance L1 is smaller than the distances L2 and L3 as described above, the fixing member 1*c* is less likely to interfere with the lower surface 801 and the upper surface 90 than the fixing members 2*c* and 3*c*, and therefore a decrease in workability related to detachment may be kept small.

Furthermore, in the present exemplary embodiment, in a case where the fixing member 1*a* is plastically deformed upon receipt of a predetermined load, the distance L1 between the leading end 131 and the end part 124 of the fixing member 1*b* or 1*c* becomes smaller than the distance between the lower surface 801 and the upper surface 90. Accordingly, as illustrated in FIG. 4, in the inclined fixing member 1*c*, the leading end 131 and the end part 124 do not interfere with the lower surface 801 and the upper surface 90. Therefore, according to the fixing member 1 according to the present exemplary embodiment, a decrease in workability related to detachment may be further kept small, as compared with the fixing members 2 and 3.

Furthermore, in the present exemplary embodiment, the end part 125 of the connection part 12 is located on a rear side relative to the leading end 131 of the engagement part 13 in the direction (the −x direction in FIGS. 2A and 2B) in which the engagement part 13 extends, as described above with reference to FIG. 2. With this configuration, stress is more likely to be concentrated on the bent part 123 upon receipt of a load, and an amount of deformation of the fixing member 1 may be increased, and therefore buffer performance may be increased, as compared with a case where this configuration is not employed.

Furthermore, in the present exemplary embodiment, the load receiving part 14 is located on a rear side relative to the end part 124 of the connection part 12 (see FIGS. 2A and 2B) in the direction (the −x direction in FIGS. 2A and 2B) in which the engagement part 13 extends. With this configuration, stress is more likely to be concentrated on the bent part 123 upon receipt of a load, and an amount of deformation of the fixing member 1 may be increased, and therefore buffer performance may be increased, as compared with a case where this configuration is not employed.

The fixing member 1 to which the exemplary embodiment of the present disclosure described above is applied is understood as a fixing member that fixes the lower surface

801 of the image forming apparatus 8 having the caster 81 to the upper surface 90 of the pallet 9, and includes the engagement part 13 that is inserted through the through hole 801A provided in the lower surface 801, extends along the upper side of the lower surface 801, and is engaged with the lower surface 801, the attachment part 11 that extends along the upper side of the upper surface 90 so as to face the engagement part 13 and is attached to the upper surface 90, the connection part 12 that has the bent part 123 bent away from the engagement part 13, is attached to the engagement part 13 at the end part 125 and is attached to the attachment part 11 at the end part 124, and connects the engagement part 13 and the attachment part 11 by passing through the through hole 801A, and the load receiving part 14 that receives a load by making contact with the lower side of the lower surface 801, wherein the end part 125 of the connection part 12 is located on a rear side relative to the end part 124 in a direction in which the engagement part 13 extends.

Modifications Etc.

Although the exemplary embodiment of the present disclosure has been described above, the technical scope of the present disclosure is not limited to the scope described in the above exemplary embodiment. It is clear from the claims that various changes or modifications to the above exemplary embodiment are also encompassed within the technical scope of the present disclosure.

Although the bent part 123 is provided on a lower side (the −z direction side) relative to the midpoint of the connection part 12 in the above exemplary embodiment, this is not restrictive. The bent part 123 may be provided on an upper side (+z direction side) relative to the midpoint of the connection part 12. That is, the bent part 123 may be provided closer to the engagement part 13 than to the attachment part 11.

However, in a case where the bent part 123 is provided on a lower side relative to the midpoint of the connection part 12 as in the above exemplary embodiment, it may be, for example, easier to incline the fixing member 1 in the procedure of FIG. 3A, and therefore it may be easier to attach the fixing member 1.

The load receiving part 14 may be any part that supports a load applied to the fixing member 1, and a shape, the number, a position, a formation method, and the like thereof are not limited. For example, although the load receiving part 14 is a curved surface in the above description, the load receiving part 14 may be a flat surface. Furthermore, a protrusion may be provided on a surface of the upper part 122 of the connection part 12 on the +x direction side, and this protrusion may be the load receiving part 14. Furthermore, the curved load receiving part 14 may be formed by a processing method different from hemming bending, and the load receiving part 14 may be provided on the same side as the engagement part 13 relative to the connection part 12.

Although the fixing member 1 has the lateral supporting part 15 in the above exemplary embodiment, the lateral supporting part 15 need not necessarily be provided. However, in a case where the lateral supporting part 15 is provided, a load is also supported by the lateral supporting part 15 when an amount of deformation becomes large, and therefore the amount of deformation is hard to become larger. That is, the amount of deformation may be kept from becoming larger than a predetermined amount.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) A fixing member that fixes a lower surface of an apparatus having a caster to an upper surface of a base, the fixing member including: an engagement part that is inserted through a through hole provided in the lower surface of the apparatus, extends along an upper side of the lower surface of the apparatus, and is engaged with the lower surface of the apparatus; an attachment part that extends along an upper side of the upper surface of the base so as to face the engagement part and is attached to the upper surface of the base; a connection part that has a bent part bent away from the engagement part, is attached to the engagement part at one end thereof and is attached to the attachment part at an other end thereof, and connects the engagement part and the attachment part by passing through the through hole; and a load receiving part that receives a load by making contact with a lower side of the lower surface of the apparatus, wherein the one end of the connection part is located on a rear side relative to the other end of the connection part in a direction in which the engagement part extends.

(((2))) The fixing member according to (((1))) configured such that in a case where the load receiving part receives a predetermined load, the connection part is plastically deformed so as to bring the engagement part and the other end of the connection part closer to each other.

(((3)) The fixing member according to (((2))) configured such that in a case where the load receiving part receives a predetermined load, the connection part is plastically deformed so that a distance between an end part of the engagement part opposite to the one end of the connection part and the other end of the connection part becomes smaller than a distance between the lower surface of the apparatus and the upper surface of the base.

(((4))) The fixing member according to (((2))) configured such that due to the plastic deformation, the bent part is bent to a larger extent so as to further move away from the engagement part.

(((5))) The fixing member according to any one of (((1))) to (((4))) configured such that the one end of the connection part is located on a rear side relative to an end part of the engagement part opposite to the one end of the connection part in the direction in which the engagement part extends.

(((6))) The fixing member according to any one of (((1))) to (((5))) configured such that the load receiving part is provided on a side opposite to the engagement part relative to the connection part.

(((7))) The fixing member according to (((6))) configured such that the load receiving part is located on a rear side relative to the other end of the connection part in the direction in which the engagement part extends.

What is claimed is:

1. A fixing member that fixes a lower surface of an apparatus having a caster to an upper surface of a base, the fixing member comprising:

an engagement part that is inserted through a through hole provided in the lower surface of the apparatus, extends along an upper side of the lower surface of the apparatus, and is engaged with the lower surface of the apparatus;

an attachment part that extends along an upper side of the upper surface of the base so as to face the engagement part and is attached to the upper surface of the base;

a connection part that has a bent part bent away from the engagement part, is attached to the engagement part at one end thereof and is attached to the attachment part at an other end thereof, and connects the engagement part and the attachment part by passing through the through hole; and a load receiving part that receives a load by making contact with a lower side of the lower surface of the apparatus, wherein the one end of the connection part is located on a rear side relative to the other end of the connection part in a direction in which the engagement part extends.

2. The fixing member according to claim 1, wherein:

in a case where the load receiving part receives a predetermined load, the connection part is plastically deformed so as to bring the engagement part and the other end of the connection part closer to each other.

3. The fixing member according to claim 2, wherein:

in a case where the load receiving part receives a predetermined load, the connection part is plastically deformed so that a distance between an end part of the engagement part opposite to the one end of the connection part and the other end of the connection part becomes smaller than a distance between the lower surface of the apparatus and the upper surface of the base.

4. The fixing member according to claim 2, wherein:

due to the plastic deformation, the bent part is bent to a larger extent so as to further move away from the engagement part.

5. The fixing member according to claim 1, wherein:

the one end of the connection part is located on a rear side relative to an end part of the engagement part opposite to the one end of the connection part in the direction in which the engagement part extends.

6. The fixing member according to claim 1, wherein:

the load receiving part is provided on a side opposite to the engagement part relative to the connection part.

7. The fixing member according to claim 6, wherein:

the load receiving part is located on a rear side relative to the other end of the connection part in the direction in which the engagement part extends.

* * * * *